(12) United States Patent
Kondo

(10) Patent No.: US 6,784,577 B2
(45) Date of Patent: Aug. 31, 2004

(54) VEHICULAR AC CURRENT GENERATOR ROTOR HAVING FIELD-COIL WINDING FINISHING-END HOOK PORTIONS

(75) Inventor: Koji Kondo, Kariya (JP)

(73) Assignee: Denso Corporation, Kariya (JP)

( * ) Notice: Subject to any disclaimer, the term of this patent is extended or adjusted under 35 U.S.C. 154(b) by 69 days.

(21) Appl. No.: 10/140,327

(22) Filed: May 8, 2002

(65) Prior Publication Data

US 2002/0167233 A1 Nov. 14, 2002

(30) Foreign Application Priority Data

May 10, 2001 (JP) ........................................ 2001-139630

(51) Int. Cl.[7] .............................. H02K 1/00; H02K 1/12; H02K 1/22; H02K 3/32
(52) U.S. Cl. ........................ 310/71; 310/267; 310/194; 310/66; 310/68 R
(58) Field of Search ................................ 310/71, 68 R, 310/66, 40 R

(56) References Cited

U.S. PATENT DOCUMENTS

| | | | | |
|---|---|---|---|---|
| 3,603,825 A | * | 9/1971 | Sheridan et al. ............ | 310/194 |
| 3,963,949 A | * | 6/1976 | Church ........................ | 310/43 |
| 4,114,056 A | * | 9/1978 | Nimura ....................... | 310/42 |
| 4,217,690 A | * | 8/1980 | Morreale ..................... | 29/596 |
| 4,307,314 A | * | 12/1981 | Yamada et al. ............. | 310/263 |
| 4,407,256 A | * | 10/1983 | Wolf ........................... | 123/599 |
| 4,520,288 A | * | 5/1985 | Santi .......................... | 310/194 |
| 4,565,936 A | * | 1/1986 | Ikegami et al. .............. | 310/62 |
| 4,636,677 A | * | 1/1987 | Yasuhara .................... | 310/194 |
| 5,270,604 A | * | 12/1993 | Sandel et al. ............... | 310/263 |
| 5,533,252 A | * | 7/1996 | Kawamura ................... | 29/734 |
| 5,698,923 A | * | 12/1997 | Scherzinger et al. ........ | 310/194 |
| 5,828,155 A | * | 10/1998 | Adachi et al. .............. | 310/263 |
| 5,898,252 A | * | 4/1999 | Tanaka et al. .............. | 310/214 |
| 6,011,343 A | * | 1/2000 | Taniguchi ................... | 310/263 |
| 6,114,786 A | * | 9/2000 | Ishida et al. ................. | 310/71 |
| 6,172,434 B1 | | 1/2001 | Oohashi et al. .............. | 310/71 |
| 6,414,413 B1 | * | 7/2002 | Arai et al. .................. | 310/214 |
| 6,509,665 B1 | * | 1/2003 | Nishiyama et al. ......... | 310/215 |
| 6,590,310 B2 | * | 7/2003 | Takano ....................... | 310/254 |

FOREIGN PATENT DOCUMENTS

EP 0 994 552 A2 4/2002

OTHER PUBLICATIONS

European Search Report EP 02 00 9966.

* cited by examiner

Primary Examiner—Burton S. Mullins
Assistant Examiner—Pedro J. Cuevas
(74) Attorney, Agent, or Firm—Oliff & Berridge, PLLC

(57) ABSTRACT

In a rotor for a vehicular alternating current generator, a field coil is wound around an insulating bobbin. A flange of the bobbin is formed with the first, second and third hook portions. A coil winding finishing end is wound around the first hook portion and is opposed to a winding direction of the field coil. The finishing end is then directed in a radially inward direction with the second hook portion, and extended further in the radially inward direction along the axial end surface of the flange. Then, the finishing end is directed in the axial direction with the third hook portion, radially inside of the outer peripheral end of the field coil. The finishing end forms an angle with itself of less than 90 degrees around the first hook portion when being viewed along an axial direction of the first hook portion.

19 Claims, 6 Drawing Sheets

VEHICULAR AC CURRENT GENERATOR ROTOR HAVING FIELD-COIL WINDING FINISHING-END HOOK PORTIONS

CROSS REFERENCE TO RELATED APPLICATION

This application is based on Japanese Patent Application No. 2001-139630 filed on May 10, 2001, the disclosure of which is incorporated herein by reference.

FIELD OF THE INVENTION

The present invention relates to a rotor for a vehicular alternating current generator mounted on passenger cars, trucks, and the like.

BACKGROUND OF THE INVENTION

In a rotor for a vehicular alternating current generator disclosed in JP-A-2000-125528 (U.S. Pat. No. 6,114,786), a field coil is wound around an insulating bobbin. The insulating bobbin has a coil-winding body around which the field coil is wound and flanges extending from both ends of the coil-winding body in a radially outward direction. One of the flanges has a first hook portion and a second hook portion to fix a coil winding finishing end that is extended from the outer peripheral surface of the field coil. The finishing end is extended in a radial direction along an axial end surface of the flange through the first hook portion, and extended further in the axial direction through the second hook portion. The second hook portion is positioned radially inside of the outer periphery of the field coil. Since the finishing end is held at a position where centrifugal force is small, the finishing end is fixed to the flange with adequate strength against the centrifugal force.

In this rotor, the finishing end is bent to form an angle with itself of substantially 90 degrees at the first hook portion. Therefore, if the finishing end is moved during post-treatment such as connection of the terminal end of the finishing end, the movement is likely to be transmitted to the coil-winding part of the field coil. As a result, the field coil is likely to easily loosen.

SUMMARY OF THE INVENTION

The present invention is made in view of the above problems, and it is an object to provide a rotor for a vehicular alternating current generator, the rotor being capable of restricting loosening of a field coil.

It is another object to provide a rotor for a vehicular alternating current generator in which a coil end of a field coil is tightly fixed.

In a rotor for a vehicular alternating current generator, a field core is press-fitted around a rotary shaft, and an insulating bobbin is fitted around the field core. The insulating bobbin has a cylindrical coil-winding body and a flange extending in a radially outward direction from an axial end of the coil-winding body. The flange has a first surface and a second surface opposite to each other. The first surface is on a side of the coil-winding body and the second surface is on an axial end of the bobbin. A field coil is wound around the coil-winding body of the bobbin. The flange is formed with a first hook portion, a second hook portion and a third hook portion. The first hook portion is to direct a coil winding finishing end of the field coil opposite to a winding direction of the field coil. The second hook portion is to direct the finishing end further in a radially inward direction.

The third hook portion is to direct the finishing end further in an axial direction.

The finishing end is wound around the first hook portion and is opposed to the winding direction of the field coil axially outside of the bobbin, and directed in the radially inward direction with the second hook portion. The finishing end is extended in the radially inward direction along the second surface of the flange. The finishing end is directed further in the axial direction with the third hook portion. Accordingly, even if the finishing end hooked with the second and the third hook portions is moved axially outside of the bobbin, the movement of the finishing end is restricted at the first hook portion and not transmitted to a coil-winding part of the field coil. Therefore, the field coil is prevented from loosening.

BRIEF DESCRIPTION OF THE DRAWINGS

Other objects, features and advantages of an embodiment will become more apparent from the following detailed description made with reference to the accompanying drawings, in which.

DETAILED DESCRIPTION OF PREFERRED EMBODIMENTS

A rotor for a vehicular alternating current generator according to the preferred embodiments of the present invention will be described hereinafter with reference to drawings.

(First Embodiment)

Figure 1:
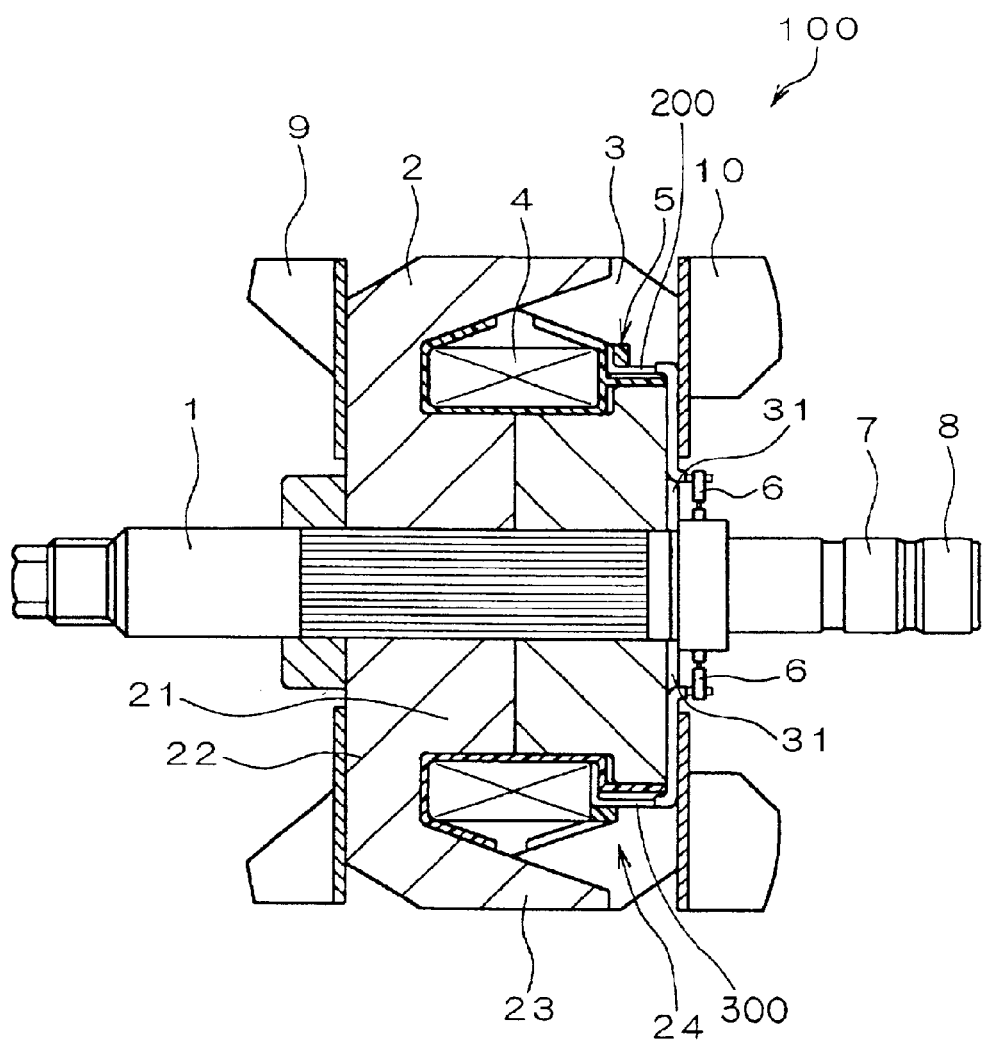
FIG. 1 is a cross-sectional view of a rotor for a vehicular alternating current generator according to the first embodiment of the present invention.

Referring to FIG. 1, a rotor 100 is rotatably supported by frames (not shown) of a vehicular alternating current generator (not shown) and driven by an engine (not shown) mounted on a vehicle. The rotor 100 is constructed of a rotary shaft 1, Lundell-type field cores 2 and 3 press-fitted around the rotary shaft 1, field coil 4 wound around the field cores 2 and 3 through an insulating bobbin 5, and cooling fans 9 and 10 fixed to axial end surfaces of the field cores 2 and 3, respectively.

Figure 3:
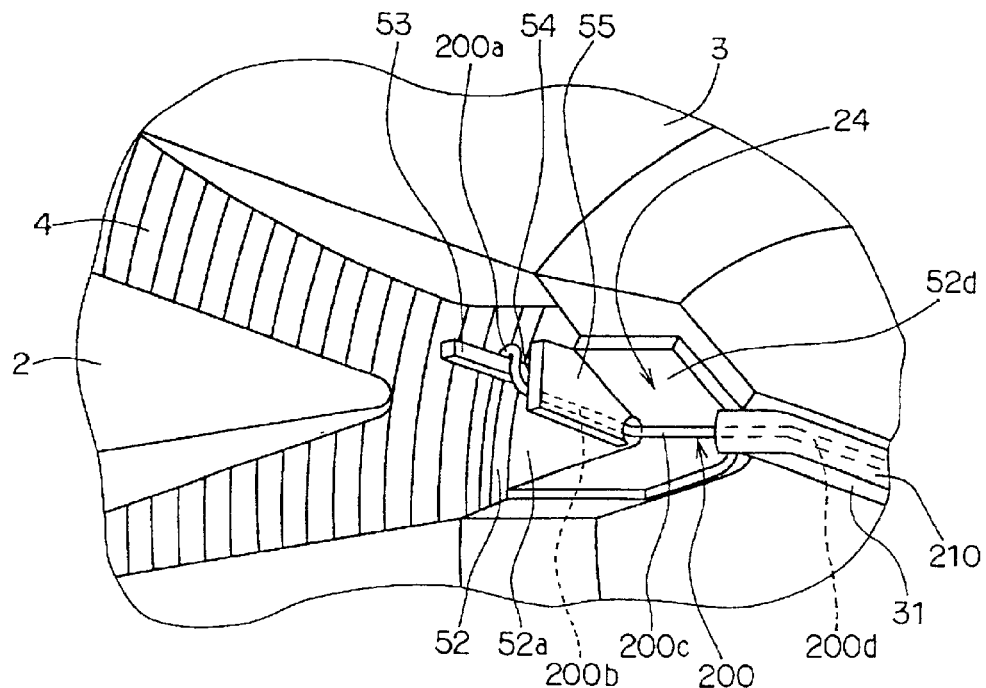
FIG. 3 is a partial perspective view of the rotor in FIG. 1.

Each of the field cores 2 and 3 has a boss part 21, radial parts 22 and claw pole pieces 23. The boss part 21 is coaxially arranged with the rotary shaft 1. The radial parts 22 extend from one of axial end surfaces of the boss part 21 in the radial direction. The claw pole pieces 23 extend from the outer peripheral parts of the radial parts 22 in the axial direction. A V-shaped groove 24 is defined between adjacent two of the radial parts 22, as shown in FIG. 3. The field cores 2 and 3 are assembled such that the plurality of claw pole pieces 23 is alternately intermeshed with each other. The field coil 4 wound around the insulating bobbin 5 is accommodated within a space surrounded with the boss parts 21, the radial parts 22 and the claw pole pieces 23.

Figure 2:
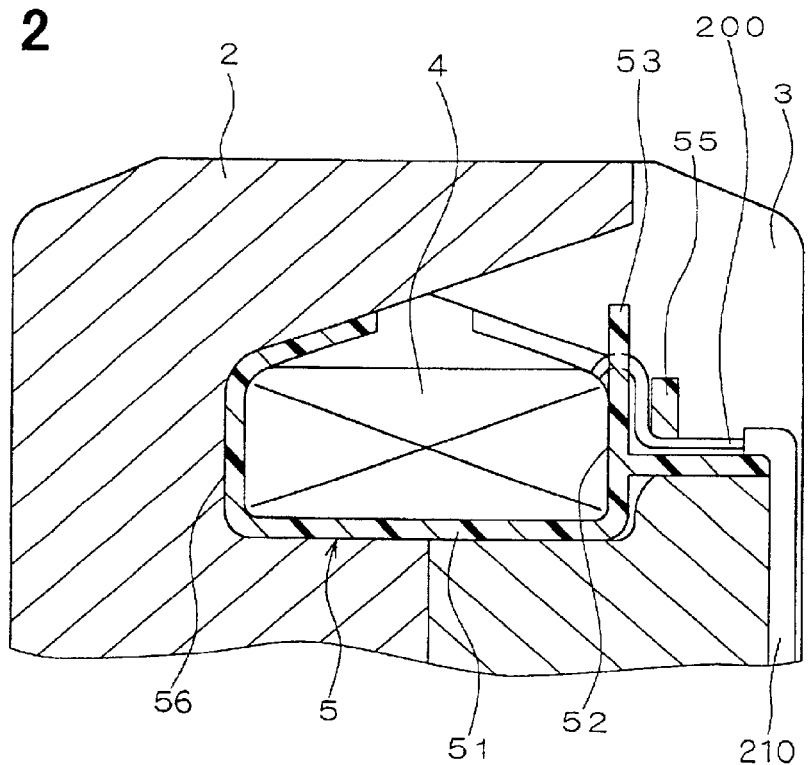
FIG. 2 is an enlarged cross-sectional view of a main part of the rotor in FIG. 1.

The insulating bobbin 5 has a cylindrical coil-winding body 51 and two flanges 52 and 56 extending from both axial ends of the coil winding body 51 in the radial direction, as shown in FIG. 2. The flange 52 is formed with two hook portions to hook a coil winding finishing end 200 and a coil winding starting end 300 of the field coil 4.

One of the hook portions, which is to hook the finishing end 200 extended from the field coil 4, has a first hook portion 53, a second hook portion 54, a third hook portion 55 and a V-shaped portion 52d. The finishing end 200 is drawn A through these three hooks 53 to 55, and then arranged to extend along the axial end surface of the field core 3 which is arranged on a rear side (right side in FIG. 1).

The finishing end 200 and the starting end 300 are pulled out of the bobbin 5 at positions axially symmetrical to each other with respect to the rotary shaft 1, as shown in FIG. 1. The finishing and 200 and the starting end 300 are extended from the field coil 4 and extended along the axial end surface of the flange 52 in the radial direction, respectively. Then, the finishing end 200 and the starting end 300 are extended along the bottom of the grooves 24 of the field core 3 in the axial direction, respectively. The finishing end 200 and the starting end 300 are then extended in the radial direction through grooves 31 that are formed on the axial end surface of the field core 3 between the end surface of the field core 3 and the cooling fan 10.

Two slip rings 7 and 8 are provided on one axial end side (right side in FIG. 1) of the rotary shaft 1 and electrically connected to a pair of connecting terminals 6.

The finishing end 200 and the starting end 300 extended along the axial end surface of the field core 3 are connected to the terminals 6, respectively. The cooling fans 9 and 10 are fixed to the axial end surfaces of the field cores 2 and 3 by welding and the like. The cooling fans 9 and 10 generate cooling air for cooling a stator (not shown) and the like mounted in the vehicular alternating current generator with rotation of the rotor 100.

Figure 4:
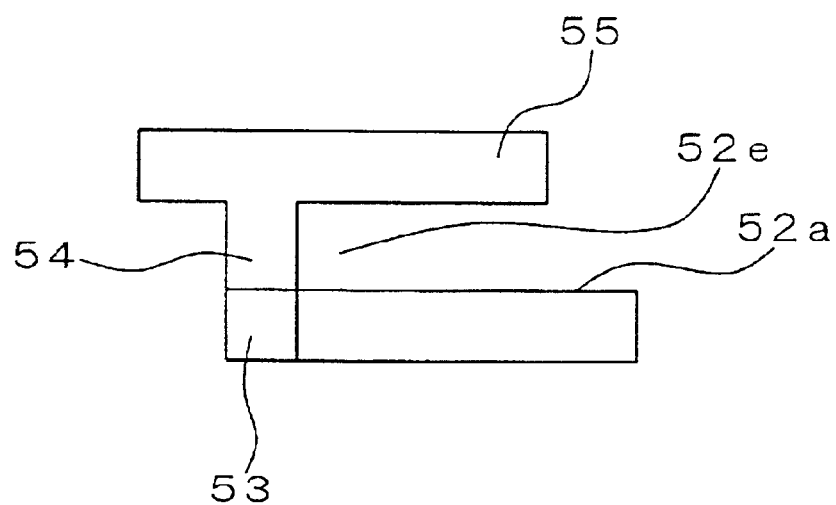
FIG. 4 is a partial enlarged view of a hook portion viewed along an axial direction of a first hook portion.

A part of the flange 52 is exposed in a fan-shape (fan-shaped portion 52a) to the axial end side in the V-shaped groove 24 of the field core 3, as shown in FIG. 3. The first hook portion 53 protrudes from the outer peripheral surface of the fan-shaped portion 52a outwardly in the radial direction. The second hook portion 54 extends from a part of the fan-shaped portion 52a in the axial direction adjacent to the first hook portion 53, as shown in FIG. 4. The third hook portion 55 is formed along an axial end surface of the second hook portion 54 opposite to the flange to extend in the circumferential direction. The third hook portion 55 is in contact with the second hook portion 54. The third hook portion 55 extends substantially parallel to the fan-shaped portion 52a such that a space 52e is defined between the fan-shaped portion 52a and the third hook portion 55 to guide the finishing end 200 in the radial direction. The V-shaped portion 52d projects in the axial direction from the third hook portion 55 in the V-shaped groove 24 of the field core 3.

The finishing end 200 of the field coil 4 is hooked on the hook portion of the flange 52 in the following manner.

First, the finishing end 200 is wound around the first hook portion 53 from axially inside to axially outside of the bobbin 5, so that a portion 200a of the finishing end 200 is directed opposite to a coil-winding direction of the field coil 4 at axially outside of the first hook portion 53 of the bobbin 5. The finishing end 200 forms an angle with itself of less than 90 degrees (an acute angle) around the first hook portion 53 when viewed along an axial direction of the first hook portion 53. The finishing end 200 is then hooked with the second hook portion 54. The finishing end 200 is directed in the radially inward direction at the radially outer edge of the second hook portion 54. A portion 200b of the finishing end 200 is guided in the radially inward direction along the axial end surface of the fan-shaped portion 52a in the space 52e.

Further, the finishing end 200 is hooked with the third hook portion 55. The finishing end 200 is directed in the axial direction at the radially inside of the third hook 20 portion 55. A portion 200c of the finishing end 200 is extended in the axial direction along the bottom of the V-shaped portion 52d. Here, the finishing end 200 is directed in the axial direction at radially inside of the outer peripheral end of the field coil 4. A portion 200d of the finishing end 200 is inserted in an insulating tube 210 and extended further in the radially inward direction in the groove 31. Then, the finishing end 200 is connected to the connecting terminal 6 by welding and the like.

The starting end 300 of the field coil 4 is, for example, hooked in a slit (not shown) provided on the flange 52. The starting end 300 is connected to the remaining terminal 6 by welding and the like. Here, since a coil winding start portion of the field coil 4 is located radially inside of the field coil 4, the field coil 4 is not easily loosened due to movement of the starting end 300.

Here, it is preferable that at least half of the last turn of the field coil 4 is wound along the axially inner surface of the flange 52. Therefore, it becomes easy to wind the finishing end 200 around the first hook portion 53 to form the acute angle with itself.

Figure 5:
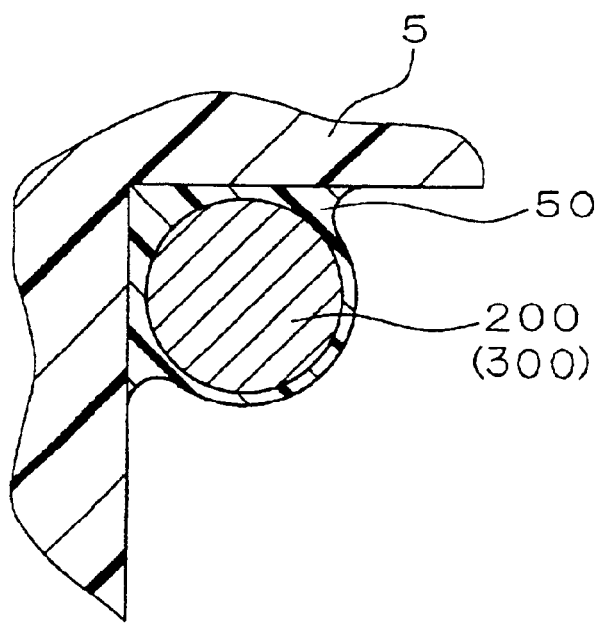
FIG. 5 is a cross-sectional view of a coil end bonded to an insulating bobbin.

An impregnated material 50 made of resin is pasted along the finishing end 200 and the starting end 300 extended through the above-described routes, so that the finishing ends 200 and the starting end 300 are bonded to the insulating bobbin 5, as shown in FIG. 5. Especially, the finishing end 200 is bent to extend along the hook portion. The impregnated material 50 is filled between the finishing end 200 and the insulating bobbin 5 at the bent portions of the finishing end 200 to bond therebetween. Accordingly, the finishing end 200 is tightly fixed to the bobbin 5.

The finishing end 200 of the field coil 4 is wound around the first hook portion 53 to form the acute angle with itself when viewed along the axial direction of the first hook portion 53. Therefore, if the finishing end 200 extending in the radially inward direction through the second hook portion 54 or the third hook portion 55 is moved, that movement is restricted at the first hook portion 53 and is not transmitted to the coil winding part of the field coil 4. Therefore, the field coil 4 is restricted from loosening and expanding due to centrifugal force. As a result, breakage of the field coil 4 is prevented and the power generating problems is decreased. Accordingly, it is possible to increase reliability of the rotor 100 and the vehicular alternating current generator having the rotor 100.

(Second Embodiment)

Figure 6:
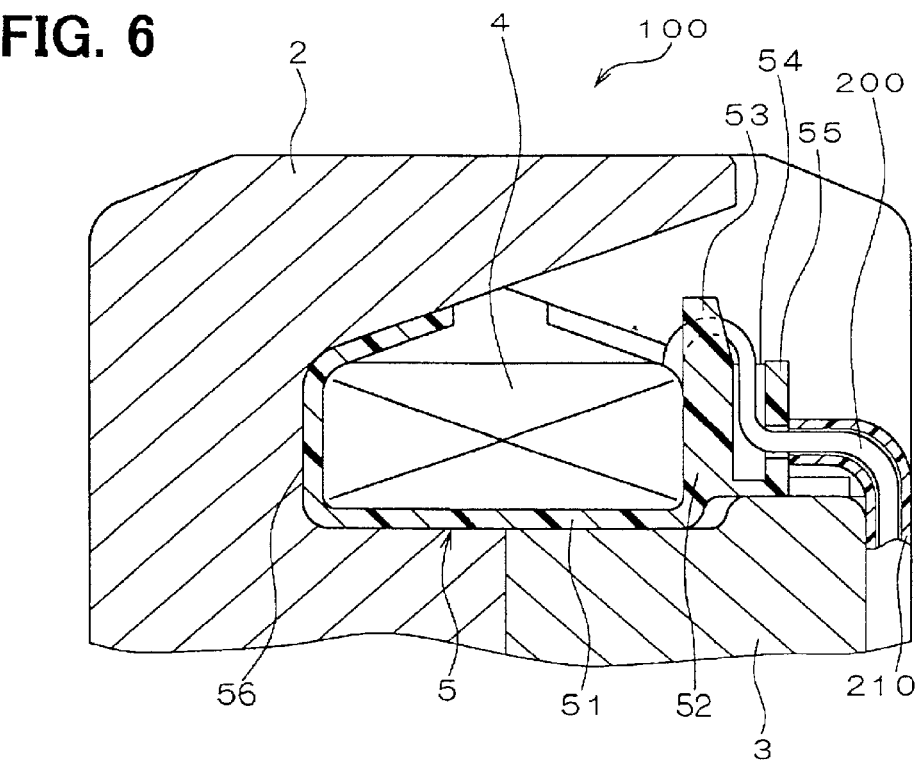
FIG. 6 is an enlarged cross-sectional view of a main part of a rotor according to the second embodiment.
Figure 7:
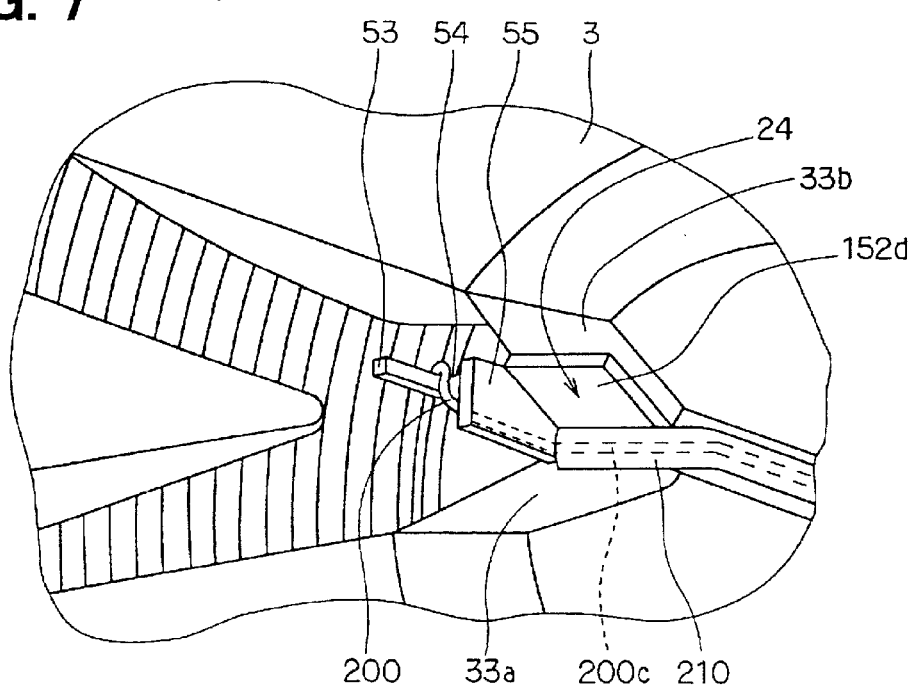
FIG. 7 is a partial perspective view of the rotor in FIG. 6.

Referring to FIGS. 6 and 7, in the second embodiment, the V-shaped portion 52d located in the V-shaped groove 24 is replaced into a projected wall portion 152d. The projected wall portion 152d is formed to extend from the axial end surface of the third hook portion 55 in the axial direction. The projected wall portion 152d is not in a V-shape, but in a single wall extending along the surface 33b of the field core 3 in the V-shaped groove 24. When the finishing end 200 is arranged to extend in the radially inward direction along the axial end surface of the flange 52, the finishing end 200 is inserted in the space 52e from the surface 33a side. Since the projected wall portion 152d is positioned only on the surface 33b, the finishing end 200 can be easily fitted in a proper position. In this case, the surface 33a of the field core 3 is exposed. Therefore, it is preferable that the portion 200c of the finishing end 200 extended in the axial direction at the bottom of the V-shaped groove 24 is inserted in the insulating tube 210 from the axial outside of the third hook portion 55 to be securely insulated from the field core 3, as shown in FIG. 7.

(Third Embodiment)

Figure 8:
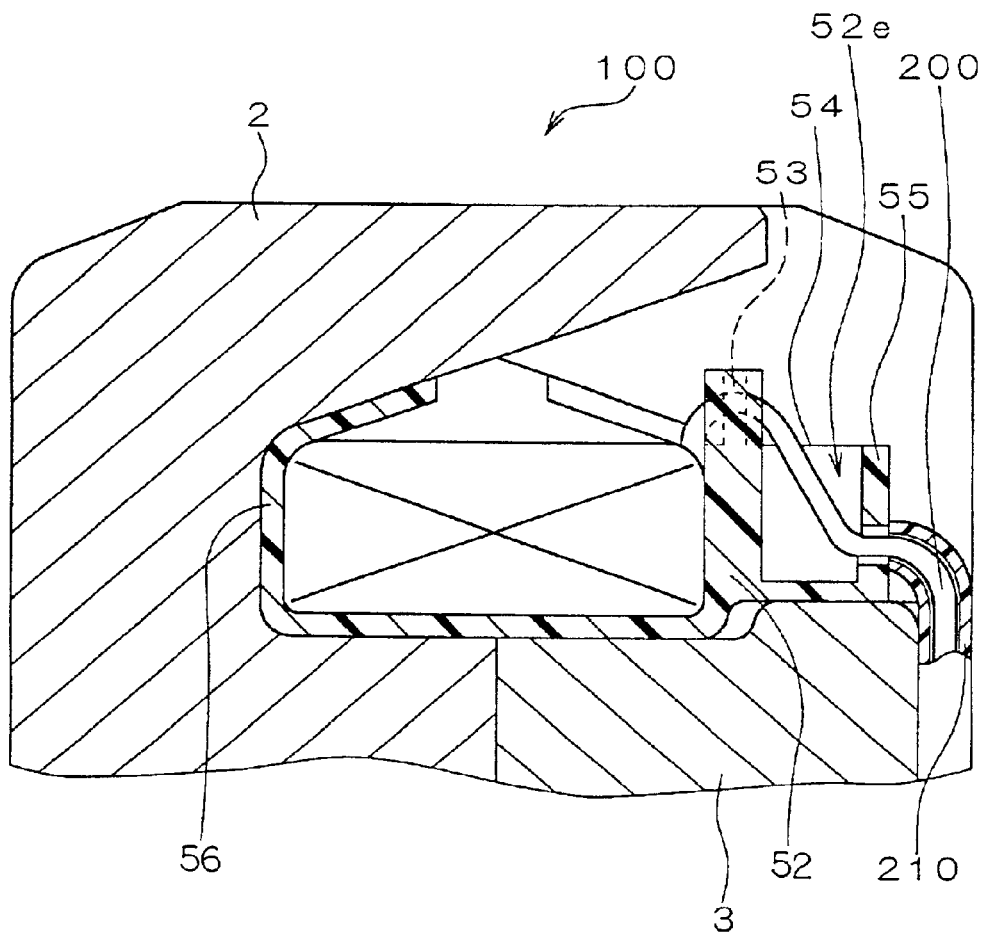
FIG. 8 is a partial enlarged cross-sectional view of a rotor according to the third embodiment.
Figure 9:
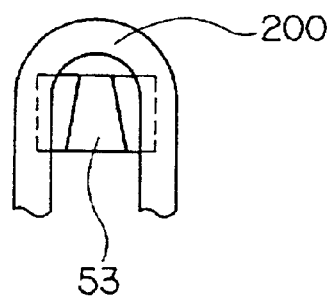
FIG. 9 is a partial view of a first hook portion viewed along an axial direction of the first hook portion according to the third embodiment.
Figure 10:
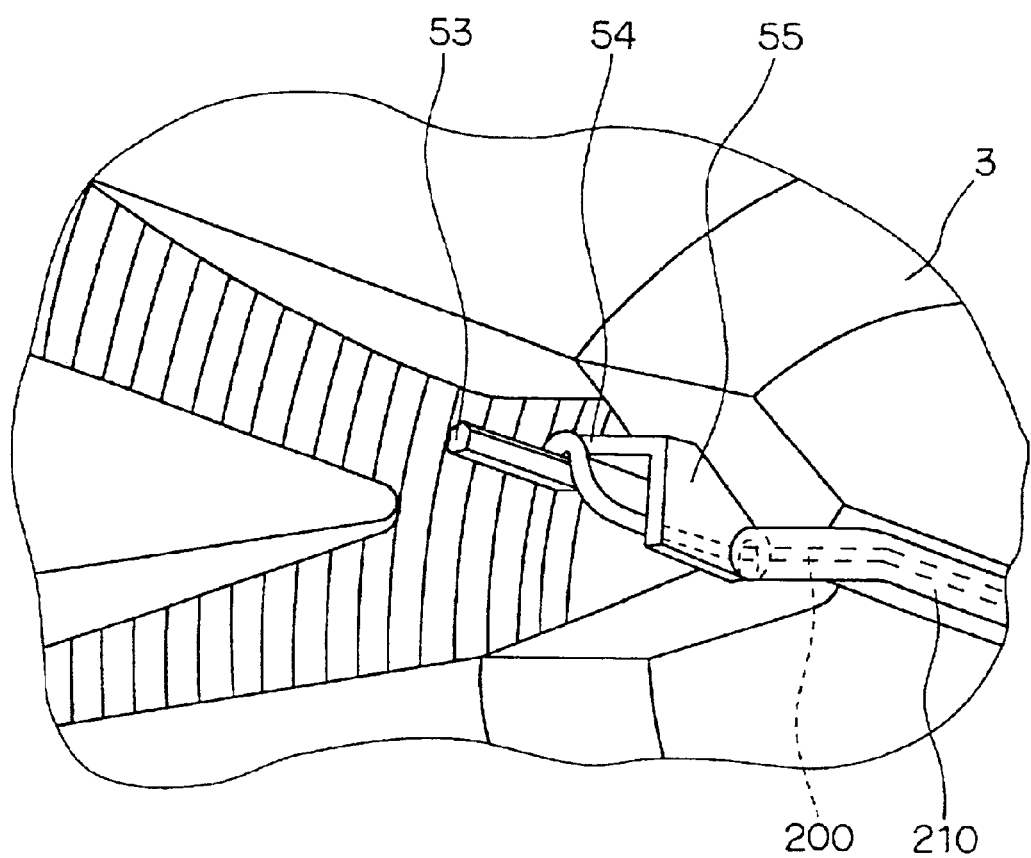
FIG. 10 is a partial perspective view of the rotor in FIG. 8.

Referring to FIGS. 8 to 10, in the third embodiment, an outer shape of the first hook portion 53 and the second hook portion 54 are changed. Edges of the first hook portion 53 around which the finishing end 200 is wound are angled to be along the finishing end 200, as shown in FIG. 9. The axial length (width) of the second hook portion 54 is increased to enlarge the space 52e in which the finishing end 200 is extended in the radial direction. With this arrangement, a curvature of radius of the finishing end 200 extending through the first hook portion 53, the second hook portion 54 and the third hook portion 55 is increased. Therefore, it is restricted that an insulating film of the finishing end 200 is damaged at the hook portions 53 to 55. Also, if each of the hooks 53 to 55 is affected by external force due to movement of the finishing end 200, stress generated on each hook is decreased. Therefore, damage on each hook is decreased, so reliability of the rotor is increased.

The present invention should not be limited to the disclosed embodiments, but may be implemented in other ways without departing from the spirit of the invention.

What is claimed is:

1. A rotor for a vehicular alternating current generator, comprising:
   a rotary shaft;
   a field core press-fitted around the rotary shaft;
   an insulating bobbin fitted around the field core, the insulating bobbin having a cylindrical coil-winding body and a flange extending in a radially outward direction from an axial end of the coil-winding body, the flange having a first surface and a second surface opposite to each other, the first surface being on a side of the coil-winding body and the second surface being an axial end surface of the bobbin; and
   a field coil wound around the coil-winding body and having a coil winding finishing end, wherein the flange is formed with a first hook portion that directs the finishing end opposite to a winding direction of the field coil by wrapping the finishing end only approximately halfway around the first hook portion, a second hook portion that directs the finishing end further in a radially inward direction along the second surface of the flange and a third hook portion that directs the finishing end further in an axial direction.

2. The rotor for the vehicular alternating current generator according to claim 1, wherein the finishing end is wound around the first hook portion and is opposed to the coil-winding direction of the field coil.

3. The rotor for the vehicular alternating current generator according to claim 1, wherein the finishing end is wound around the first hook portion and placed axially outside of the bobbin, thereby forming an angle with itself of less than 90 degrees when viewed along an axial direction of the first hook portion.

4. The rotor for the vehicular alternating current generator according to claim 1, wherein the finishing end is wound around the first hook portion, directed in a radially inward direction with the second hook portion, extended further in the radially inward direction along the second surface of the flange and directed further in the axial direction with the third hook portion.

5. The rotor for the vehicular alternating current generator according to claim 1, wherein at least half of a last turn of the field coil is wound around the coil-winding body along the first surface of the flange.

6. The rotor for the vehicular alternating current generator according to claim 1, wherein the finishing end is fixed to the flange by an impregnated material.

7. The rotor for the vehicular alternating current generator according to claim 1, wherein the first hook portion protrudes from an outer peripheral surface of the flange in the radial direction, a second hook portion extends from the second surface of the flange adjacent to the first hook portion, and a third hook portion is formed along an axial end surface opposite to the flange on the second hook portion and extends substantially parallel to the flange, thereby defining a space between the third hook portion and the flange.

8. The rotor for the vehicular alternating current generator according to claim 7, wherein the finishing end is wound around the first hook portion to oppose the winding direction of the field coil, directed in the radially inward direction at a radially outer end of the second hook portion, extended further in the space in the radially inward direction and directed further in the axial direction radially inside of the third hook portion.

9. The rotor for the vehicular alternating current generator according to claim 8, wherein the finishing end is directed in the axial direction at a position radially inside of an outer peripheral end of the field coil.

10. A rotor for a vehicular alternating current generator, comprising:
    a rotary shaft;
    a field core press-fitted around the rotary shaft;
    an insulating bobbin fitted around the field core, the insulating bobbin having a cylindrical coil-winding body and a flange extending in a radially outward direction from an axial end of the coil-winding body, the flange having a first surface and a second surface opposite to each other, the first surface being on a side of the coil-winding body and the second surface being an axial end surface of the bobbin; and
    a field coil wound around the coil-winding body and having a coil winding finishing end, wherein the flange is formed with a hook portion to fix the finishing end, the hook portion has a first portion protruding from an outer peripheral surface of the flange in a radial direction, a second portion extending from the second surface of the flange adjacent to the first portion, and a third portion formed along an axial end surface opposite to the flange on the second portion and extending substantially parallel to the flange, thereby defining a space between the third portion and the flange on a trailing side of the second portion with respect to a winding direction of the field coil and the finishing end extends through the space in a radially inward direction on a trailing side of the first portion with respect to the winding direction of the field coil.

11. The rotor for the vehicular alternating current generator according to claim 10, wherein the finishing end is wound around the first portion to oppose a winding direction of the field coil and directed further in a radially inward direction at a radially outer end of the second portion.

12. The rotor for the vehicular alternating current generator according to claim 11, wherein the finishing end forms an angle with itself of less than 90 degrees around the first portion when viewed along an axial direction of the first portion.

13. The rotor for the vehicular alternating current generator according to claim 11, wherein the finishing end is further guided in the space in the radially inward direction and directed further in the axial direction radially inside of the third portion.

14. The rotor for the vehicular alternating current generator according to claim 10, wherein at least half of a last turn of the field coil is wound around the coil-winding body along the first surface of the flange.

15. The rotor for the vehicular alternating current generator according to claim 10, wherein at least half of a last turn of the field coil is wound around the coil-winding body and is substantially parallel to the flange before being wound around the first portion.

16. The rotor for the vehicular alternating current generator according to claim 10, wherein the finishing end is directed in the axial direction at a position radially inside of an outer peripheral end of the field coil.

17. The rotor for the vehicular alternating current generator according to claim 10, wherein the finishing end is bent around the first portion, placed axially outside of the bobbin to extend in a direction opposite to the winding direction of the field coil and directed further in the radially inward direction at a radially outer end of the second portion.

18. A rotor for a vehicle alternating current generator, comprising:

a rotary shaft;

a field core fixed around the rotary shaft;

an insulating bobbin fixed around the field core, the insulating bobbin having a cylindrical coil-winding body and a flange extending from the coil-winding body in a radially outward direction; and a field coil wound around the coil-winding body and including a coil winding finishing end, wherein the flange of the insulating bobbin has a first flange surface and a second flange surface opposite to each other, the first flange surface is on a side of the coil-winding body, the flange forms a first hook portion extending from an end of the flange in the radial direction, a second hook portion on the second flange surface, and a third hook portion axially outside of the second hook portion and defining a space between itself and the second flange surface, and the coil winding end is held such that the coil winding end is turned at the first hook portion, extended in a radially inward direction on a trailing side of the second hook portion with respect to a winding direction of the field coil, and further directed axially outside by the third hook portion.

19. The rotor according to claim 18, wherein the second hook portion is located proximate to the first hook portion with respect to a circumferential direction of the insulating bobbin.

* * * * *